F. LATTA.
Steam-Engines.
No. 5,985. Reissued July 28, 1874.
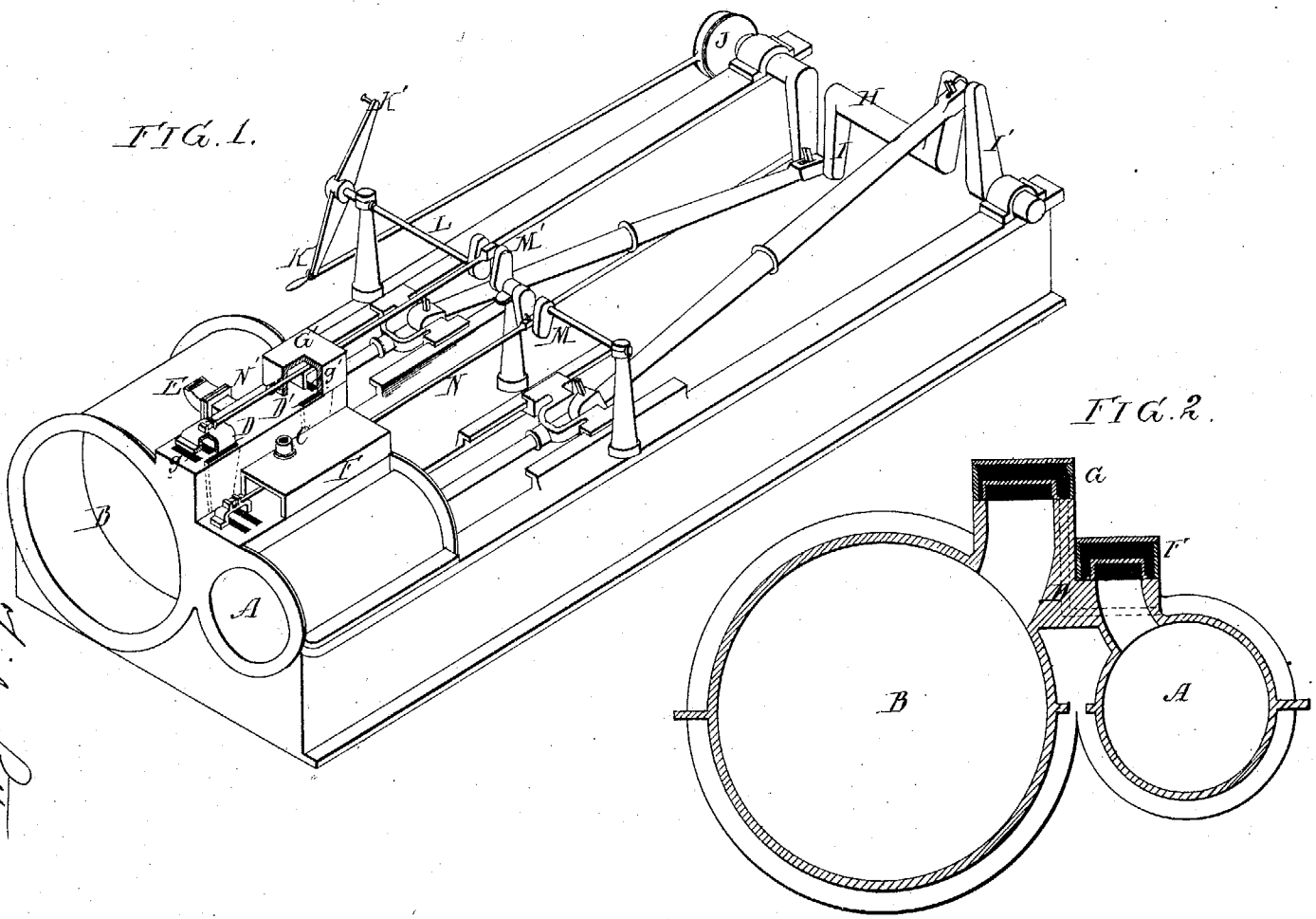
Witnesses, S. McPoe
Thomas McIlvain
Finley Latta
by his Attys.
Houston and Son
THE GRAPHIC CO. PHOTO-LITH. 39 & 41 PARK PLACE, N.Y.

UNITED STATES PATENT OFFICE.

FINLEY LATTA, OF CINCINNATI, OHIO, ASSIGNOR TO JOHN B. WOOD AND RANDOLPH WOOD, OF PHILADELPHIA, PENNSYLVANIA.

IMPROVEMENT IN STEAM-ENGINES.

Specification forming part of Letters Patent No. 55,122, dated May 29, 1866; reissue No. 5,985, dated July 28, 1874; application filed June 13, 1874.

*To all whom it may concern:*

Be it known that I, FINLEY LATTA, of Cincinnati, Hamilton county, Ohio, have invented certain new and useful Improvements in Steam-Engines; and I do hereby declare the following to be a full, clear, and exact description of the same, reference being had to the accoming drawing making part of this specification.

My improvement relates to compound steam-engines, in which the exhaust steam from a high-pressure cylinder is used, in an expanded form, in another cylinder before final exhaustion; and my invention consists of a valve-motion, by means of which the valves of both cylinders are operated from one shaft.

In the accompanying drawing, Figure 1 is a perspective view of a compound engine with my improvements. Fig. 2 is a cross-section of the two cylinders.

The small cylinder A and the large cylinder B are arranged side by side, as closely as practicable. With this object in view I prefer to form both cylinders, together with their steam-ports, in a single casting, as represented in the accompanying drawing.

The small cylinder A receives steam from the boiler through a pipe, C, and exhausts into the larger cylinder through passages D D′, the cylinder B in its turn exhausting, through a pipe or passage, E, either into the open air or into a condenser, as may be preferred.

The valve-chests of the respective cylinders may be single, as at F, or double, as at G G′.

The cylinder A exhausts, by flaring passages D D′, into the valve-chests G G′, which chests, together with their ports *g g′*, are made of somewhat greater capacity than the corresponding parts of the cylinder A. The pistons of both cylinders are connected to a common crank-shaft, H, whose cranks I I′ point in diametrically-opposite directions.

The crank-shaft H is provided with a single customary eccentric, J, which, being connected either to the direct wrist K or to the reverse wrist K′ of a rock-shaft, L, serves to work at the same time both sets of valves, through the medium of suitable arms M M′ and rods N N′, of usual construction.

The described arrangement of valve-chests in juxtaposition also acts to economize material, space, and steam.

The inequality of effective area on the two sides of the common reciprocating piston, due to the space taken up by the rod, is in the above arrangement partly neutralized, because when the sole of one piston is in action the rod side of the other piston is in action.

By working the steam into the similar or corresponding end of the larger cylinder, and the piston in reverse directions, I am enabled to make one eccentric and one rock-shaft serve for both sets of valves.

I claim herein as new and of my invention—

The combination of two cylinders provided with pistons and valves, and a single rock-shaft and reversing device, common to both valves, substantially as specified.

In testimony whereof I have signed my name to this specification in the presence of two subscribing witnesses.

FINLEY LATTA.

Witnesses:
JOHN W. CARTER,
H. G. H. TARR.